Dec. 28, 1954  G. E. HANSEN  2,698,160
VALVE WITH PLURAL MECHANICAL MOVEMENT
Filed June 21, 1951
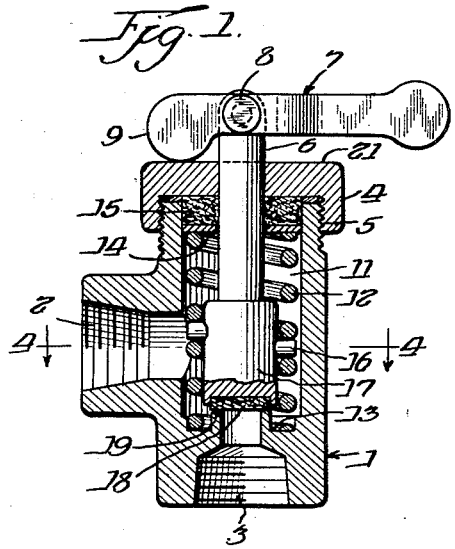
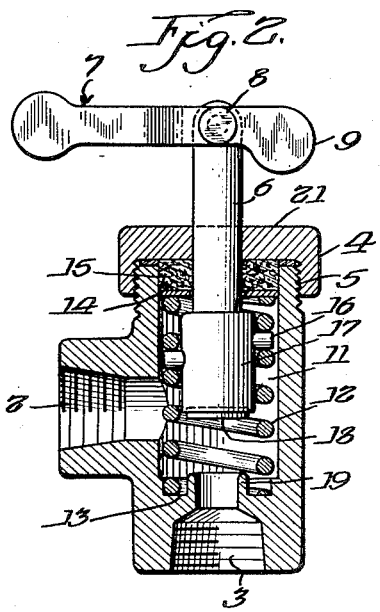
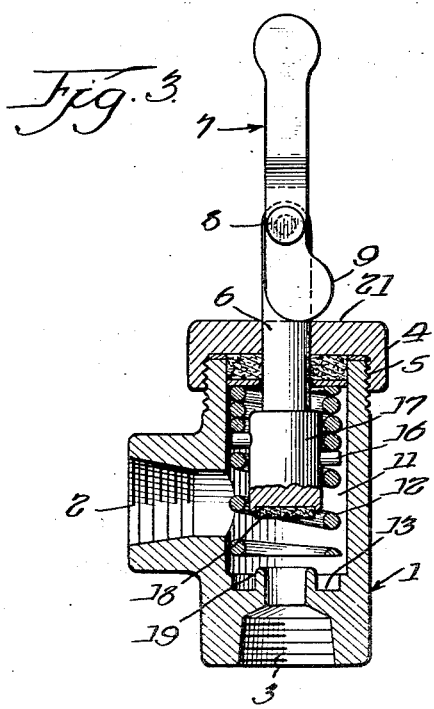
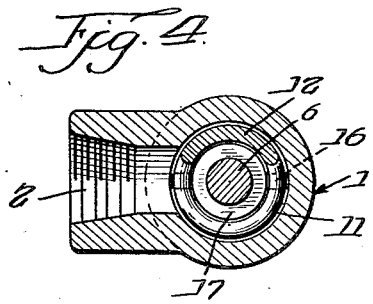
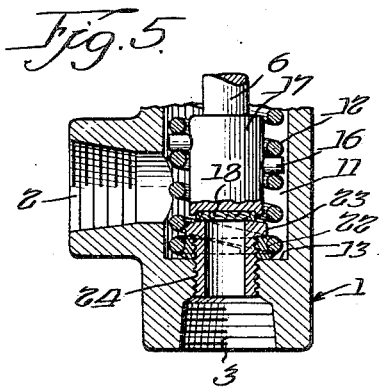
Inventor:
George E. Hansen
By Joseph O. Lang
Atty.

United States Patent Office 2,698,160
Patented Dec. 28, 1954

2,698,160

VALVE WITH PLURAL MECHANICAL MOVEMENT

George E. Hansen, Chicago, Ill., assignor to Crane Co., Chicago, Ill., a corporation of Illinois Application June 21, 1951, Serial No. 232,731

3 Claims. (Cl. 251—221)

This invention relates to a combined self-closing and quick-opening valve. More particularly, it is concerned with a novel form of valve in which the usual forms of screw threads provided within the valve for reciprocally moving an actuating stem are replaced by a coiled spring, the latter spring serving the purpose of providing a spiral path for a projecting portion of a rotatable stem thereby to simulate a thread in performance.

Another object is to provide for a valve in which the actuating stem journaled within a coiled spring may also be rendered quick closing or quick opening by means of a cam mechanism employed in combination with such lever or stem.

Another object is to provide for an actuating valve mechanism in which the assembly may be conveniently removed as a unit therefrom for purposes of replacement, inspection, or repair.

Another object is to provide for a structure in which the coiled spring not only serves as a means for effecting axial movement of a stem upon suitable rotation of the latter member but also acts as the means for compressing the packing in an upper portion of the valve.

Other objects and advantages will become more readily apparent upon proceeding with a description of the device read in light of the specification and the accompanying drawings, in which Fig. 1 is a sectional assembly view of a valve in the closed position embodying my invention.

Fig. 2 is a similar view with the valve in the open position.

Fig. 3 is a view of the same valve with the quick-opening mechanism in operation and with the valve in open position.

Fig. 4 is a sectional view taken on the line 4—4 of Fig. 1.

Fig. 5 is a view of a modified form of spring mounting.

Similar reference numerals refer to similar parts throughout the several views.

Referring now to Fig. 1, a valve embodying our invention is shown having a casing or body generally designated 1 with the inlet 2 and the outlet 3 provided with the usual pipe connection, not shown. At the upper end portion of the body, a cap member 4 is threadedly attached, as at 5, and serves as a journalling means for the combined rotatable and reciprocally movable stem 6. At the upper end portion of the stem, a lever pivotally attached thereto is attached as indicated at 7 to the bifurcated mounting. As shown, at the left-hand end portion of the lever 7, a suitable rounded cam surface 9 is employed for reasons hereinafter explained (see Fig. 3).

Within the hollow chamber 11 of the body 1, as shown in Fig. 1, the coiled spring 12 is supported at the lower end portion thereof against the casing surface 13 and is interposed within the casing, so that at its upper end it bears against the underside of the annular washer 14 and thereby compresses the packing 15. The spring is so formed and mounted as to permit of spirally extending spaces between its coils as shown. The spring is preferably of such length that it will extend beyond the seating face of the closure member to firmly support the spring under compression. Thus, the spring is of such length that it will disengage the body about the seat 19 upon compression of the coils at the opposite end thereof, as shown more clearly in Fig. 3. Upon release of the lever 7 and cam 9, the spring 12 will draw the stem 6 and the closure member 18 toward the valve seat 19, the lower end of the spring contacting the body adjacent the valve seat before the closure member 18 contacts seat 19. The lower end of the stem has an enlarged end stem portion 17 preferably fitting snugly within the coils of the spring, and the stem is provided with transversely extending rods 16 in different planes, as illustrated, and of such length as to project between the coils of the spring as indicated. Preferably, the rods or pins 16 are of a length sufficient to extend at least to the outside diameter of the spring coils and bear slidably on oppositely disposed surfaces of such coils. At the lower end 17 of the stem 6, a valve disc 18, which may be either integral with the stem or attached thereto and of a special composition or a material, is adapted to engage in abutting relation the valve seat 19 of the casing 1. Thus, as indicated in Fig. 1, if the lever 7 while in the horizontal position shown were rotated in a counterclockwise direction (when viewed from above), such stem rotation will cause the rods 16 to be moved along on the outer surfaces of the coils upwardly thereby to move the stem vertically and break the contact of the valve seat at 19, to open the valve, and thereby to permit the fluid flow to pass through and into the outlet 3 of the valve. The valve will ultimately assume the position shown in Fig. 2.

Suppose, however, it is desired to open the valve quickly in order to allow for a rapid fluid flow into the pipe line, as, for example, on some manufacturing process. Under such conditions, the lever 7 is pivotally moved by means of the bifurcated mounting and pin 8 of the stem 6 to bear on the horizontal surface constituting the top 21 of the cap 4. Under such conditions, as shown in Fig. 3, the coils of the spring 12 will be collapsed above the pins 16, thereby to draw the stem rapidly upwardly and allow the valve disc end 18 to leave the body seat 19. Under such conditions, depending upon the amount of engagement of the pins 16 with the coils of the spring 12, the stem and disc will assume the position shown. The packing 15 under such circumstances will be compressed to a greater extent than under the compression load normally exerted by the spring 12 bearing against the washer 14.

Under certain conditions, instead of having the coil springs relatively loose and in abutting contact against the lower portion of the casing contacting at annular surface 13 as shown more clearly in Fig. 5, in a modified form, the spring 12 may have its lower ends of the coil at 22 positively attached to the threaded seat 23, thus keeping the spacings between the coils of the spring 16 uniform throughout the entire travel of the pin 16 upon the coils 12 of the spring. However, in other respects, the operation is the same as previously described, and the valve may be used for throttling purposes depending upon the number of coils in engagement by the pins 16 when the rotation of the stem 6 is halted. Thus, relatively, the valve stem may assume any axial position depending upon the number of coils of the spring traversed in either opening or closing the valve. While the valve seat is shown as being threadedly attached, as at 24, it is obvious that other means may be used for attachment or in some cases it may be made integral with the casing 1.

Thus, the particular embodiments shown are merely for purposes of illustration and, therefore, the spirit of the invention should be measured by the scope of the appended claims.

I claim:

1. A combined quick-opening self-closing valve including a valve body, a cover therefor, an actuating stem, a pivotally mounted lever on the said stem, the said lever having a cam surface at an end portion thereof for cooperation with said cover, a closure member cooperating with said actuating stem, a seat in the said valve body for the said closure member, and a coil spring within the said body encircling a portion of the said stem, the said stem having transversely positioned pins in different planes for engagement with coils of the spring, the said spring functioning as a thread when in engagement with the said stem pins, whereby upon rotation of the said stem the pins move along the outer surfaces of the coils of the spring to effect reciprocation of the stem and closure member and upon pivotal movement of the said lever with the cam surface bearing against the said cover, the said stem and closure member may be reciprocally moved independently, the said spring upon release of such lever and cam serving to draw the said stem and closure member toward the said valve seat.

2. A combined quick-opening self-closing valve including a valve body, a cover therefor, an actuating stem with a pivotally mounted lever on the said stem supported by said cover, the said lever having a cam surface at an end portion thereof to contact said cover, a closure member cooperating with said actuating stem, a seat in the said valve body for the said closure member and a coil spring within the said body encircling an enlarged portion of the said stem, the said stem at said enlarged portion having a projecting pin on a side thereof for engagement with the coils of the spring, the said spring functioning as a thread when in engagement with the said stem pin, whereby upon rotation of the said stem the pin moves spirally along the coils of the spring to effect reciprocation of the said stem and closure member, the said stem and closure member also being reciprocally movable independently upon predetermined pivotal movement of said lever, the said cam upon such movement of the lever drawing the said stem and closure member away from the said valve seat.

3. A combined quick-opening self-closing valve including a valve body, a cover therefor, an actuating stem with a pivotally mounted lever on the said stem, the said lever having a cam surface at an end portion thereof for cooperation with a plain surface of the said cover, a closure member cooperating with said actuating stem, a seat in the said valve body for the said closure member and a coiled spring within the said body encircling a portion of the said stem, the said stem having a transversely positioned pin for sliding engagement with coils of the spring, the said spring being of such length that it normally extends beyond the seating face of the said closure member and will disengage the said body about said seat upon suitable compression of the coils of said spring at the opposite end thereof, the coils of said spring functioning as a thread in engagement with the said stem pin, thereby upon rotation of the said stem the pin moves along the coils of the spring to effect reciprocation of the said stem and closure member and upon pivotal movement of the said lever with the said cam surface bearing against the said cover plain surface, the said stem and closure member may be reciprocally moved independently, the said spring upon release of such lever and cam serving to draw the said stem and closure member toward the said valve seat and with the lower ends of the spring contacting the body adjacent the valve seat preliminary to the closure member making said seat contact.

References Cited in the file of this patent

UNITED STATES PATENTS

| Number | Name | Date |
|---|---|---|
| 14,429 | Woodbury | Mar. 11, 1856 |
| 2,079,212 | Humblet | May 4, 1937 |
| 2,210,375 | Mueller | Aug. 6, 1940 |
| 2,578,109 | Tillberg | Dec. 11, 1951 |

FOREIGN PATENTS

| Number | Country | Date |
|---|---|---|
| 177 | Great Britain | of 1893 |
| 78,240 | Germany | of 1894 |
| 99,317 | Germany | of 1897 |